United States Patent [19]

Ellithorpe et al.

[11] 4,050,740
[45] Sept. 27, 1977

[54] METHOD OF AND APPARATUS FOR MELTING BLOCK SULPHUR

[76] Inventors: Ernest Ralph Ellithorpe, 267-43rd Ave., North West, Calgary, Alberta, Canada, T2K 0H9; Richard Calvin Ellithorpe, 336 Cedarbrae Crescent, South West, Calgary, Alberta, Canada, T2W 1Y4

[21] Appl. No.: 659,159

[22] Filed: Feb. 18, 1976

[30] Foreign Application Priority Data

Feb. 20, 1975 United Kingdom ............... 7098/75
May 2, 1975 United Kingdom ............. 18343/75

[51] Int. Cl.$^2$ .................... E21C 37/16; E21C 41/14; B01J 1/00; B01J 6/00
[52] U.S. Cl. ................................. 299/6; 23/293 S; 126/343.5 A; 299/14; 165/86
[58] Field of Search ............... 23/293 S, 280, 293 R; 126/343.5 A; 165/86; 299/3, 6, 14, 24

[56] References Cited

U.S. PATENT DOCUMENTS

| 1,421,416 | 7/1922 | Davis et al. | 23/280 |
| 1,918,684 | 7/1933 | Bragg | 23/280 |
| 2,239,833 | 4/1941 | Storrs | 23/280 |
| 3,804,154 | 4/1974 | Asdell et al. | 126/343.5 A |

*Primary Examiner*—Norman Yudkoff
*Assistant Examiner*—Barry I. Hollander
*Attorney, Agent, or Firm*—Fleit & Jacobson

[57] ABSTRACT

A method of, and apparatus for, melting block sulfur to avoid contamination of the environment by sulfur dust employ a heating element having a plurality of flow passages formed by pipe sections in a generally planar array, with a steam inlet and a condensate outlet enabling steam to be flowed through the passages. The underside of the heating element has a flow surface adjacent one edge thereof, and a suspension is provided for lowering the heating element onto the sulfur block with the heating element downwardly inclined towards that edge and with the edge projecting beyond the sulfur block so that molten sulfur adhering by surface tension to the flow surface flows beyond the sulfur block and drops into a collecting trough.

15 Claims, 7 Drawing Figures

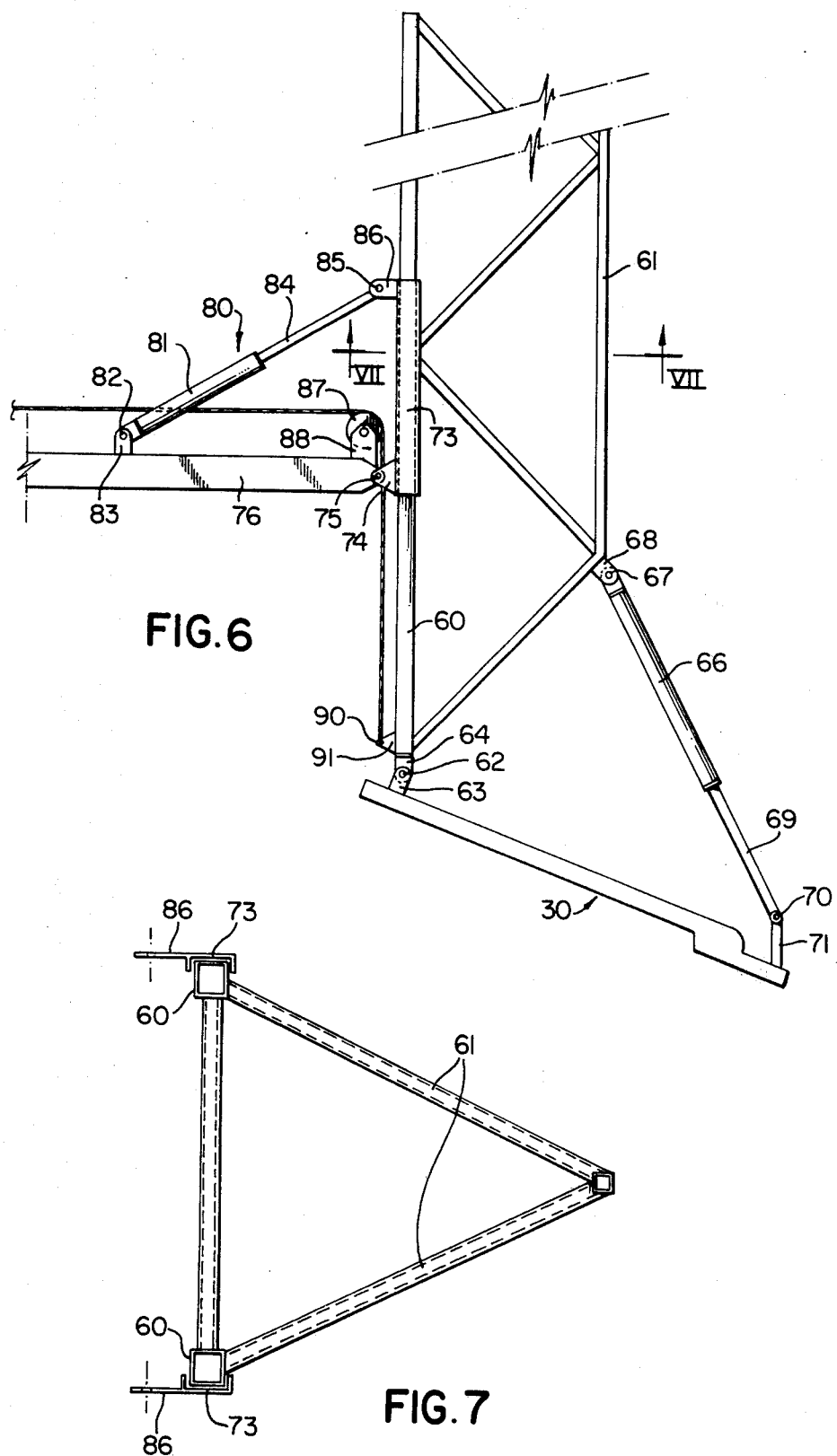

METHOD OF AND APPARATUS FOR MELTING BLOCK SULPHUR

The present invention relates to methods of and apparatus for melting block sulfur.

During the extraction from the earth of natural gas, large quantities of sulfur are produced as a by-product. It is common practice to store such sulfur in very large blocks, particularly in regions where, depending upon the prevailing price of sulfur, it may be uneconomic to transport the sulfur from the place at which the natural gas is produced to an appropriate industrial market for the sulfur.

However, when such transportation of the sulfur is required, e.g. as a result of rises in the cost of sulfur, the removal of the sulfur from the sulfur blocks presents a considerable problem.

In the past, explosives and/or mechanical breaking up of the sulfur block have usually been used to convert the block sulfur to sulfur in the form of lumps and power and thereby to enable the sulfur to be removed from the blocks.

However, such breaking up of the sulfur is highly disadvantageous, since it produces a considerable quantity of sulfur dust, which severely pollutes the surrounding environment and constitutes a health hazard.

To avoid these disadvantages, it has previously been proposed to remove the sulfur from the blocks by melting the sulfur.

For this purpose, a heating element has been positioned horizontally on the top of a block, at a spacing from the sides of the block, to melt the sulfur underlying the heating element. The molten sulfur is then removed from beneath the heating element by an appropriate pump.

However, this previously-proposed process has a number of disadvantages. For example, it has been found that the pool of molten sulfur underlying the heating element tends to escape through fissures in the sulfur block, which results in an uneconomic loss of heat. Also, the heating element eventually forms a vertical shaft extending downwardly through the sulfur block, and is then withdrawn from the shaft, moved to a different position on the sulfur block, and employed to form a second shaft spaced from the first shaft by a wall of sulfur. When this process has been repeated a number of times, there remain a number of walls of unmelted sulfur between the shafts, and it is then necessary to break down these unmelted walls of sulfur by mechanical means, which again causes the pollution and health hazards referred to above.

It is an object of the present invention to provide a novel and improved method of and apparatus for melting block sulfur which eliminates pollution of the environment by sulfur dust.

It is a further object of the present invention to provide a novel and improved method of and apparatus for melting block sulfur which enable substantially the whole of a sulfur block to be melted.

In accordance with the present invention, apparatus for melting block sulfur comprises a heating element defining a plurality of flow passage in a generally planar array, steam inlet passage means communicating with the flow passages for supplying steam thereto, outlet means communicating with the flow passages for discharging condensate therefrom, means defining a flow surface at the underside of the heating element at and adjacent at least one edge thereof for flowing molten sulfur by surface tension along the underside of the heating element, means for suspending the heating element at an inclination with the heating element downwardly inclined towards said edge thereof, and means for collecting the melted sulfur beneath the flow surface defining means.

When this apparatus is in use, the heating element is lowered onto the upper surface of a sulfur block, and steam is supplied through the steam inlet passage means into the flow passages, which may conveniently comprise a plurality of straight, parallel pipe sections.

The pipe sections may be in direct contact with the sulfur block, or may be separated therefrom by a plate providing the flow surface.

In one embodiment of the invention, the flow surface is provided at the underside of a header communicating with the lower ends of the pipe sections and providing the outlet means, and the header is downwardly offset from the plane of the pipe sections, so that the sulfur melted by the pipe sections, in direct contact therewith, may flow over the top of, and along the underside of, the header.

In either case, the flow surface is disposed so that it projects beyond the edge of the sulfur block. Consequently, the molten sulfur flows beyond the block edge, where it is collected, conveniently by means of a trough suspended so as to allow the molten sulfur to flow downwardly by gravity. To counteract solidification of the sulfur in the trough, the trough may be provided with steam passages for heating the sulfur.

The invention will be more readily understood from the following description of a preferred embodiment thereof given, by way of example, with reference to the accompanying drawings, in which:

FIG. 6 shows a side view of the heating element of FIGS. 4 and 5 and of a suspension mechanism for supporting the heating element; and FIG. 7 shows a view taken in horizontal section along the line VII—VII of FIG. 6.

Figure 1:
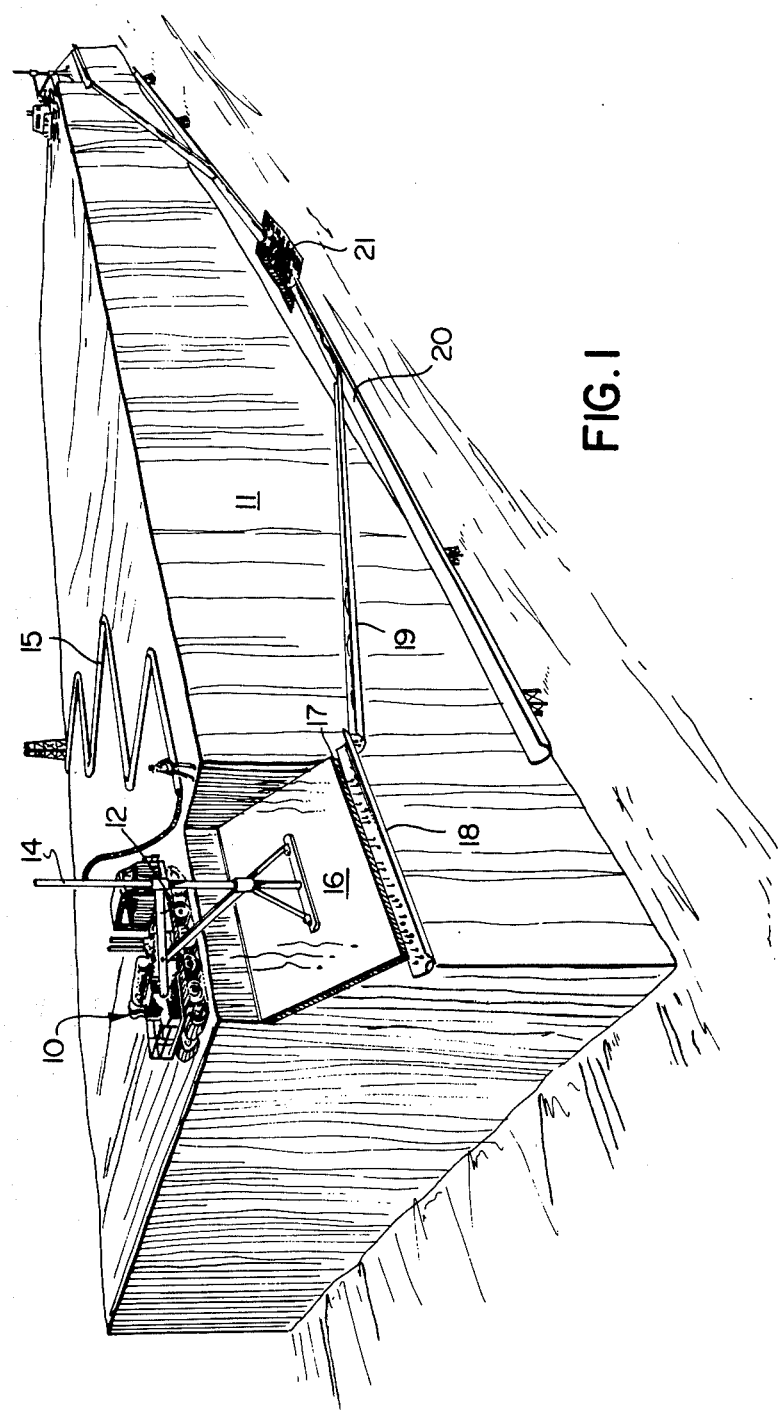
FIG. 1 shows a diagrammatic view, in perspective, of a sulfur melting apparatus embodying the present invention in use on a block of sulfur.
Figure 2:
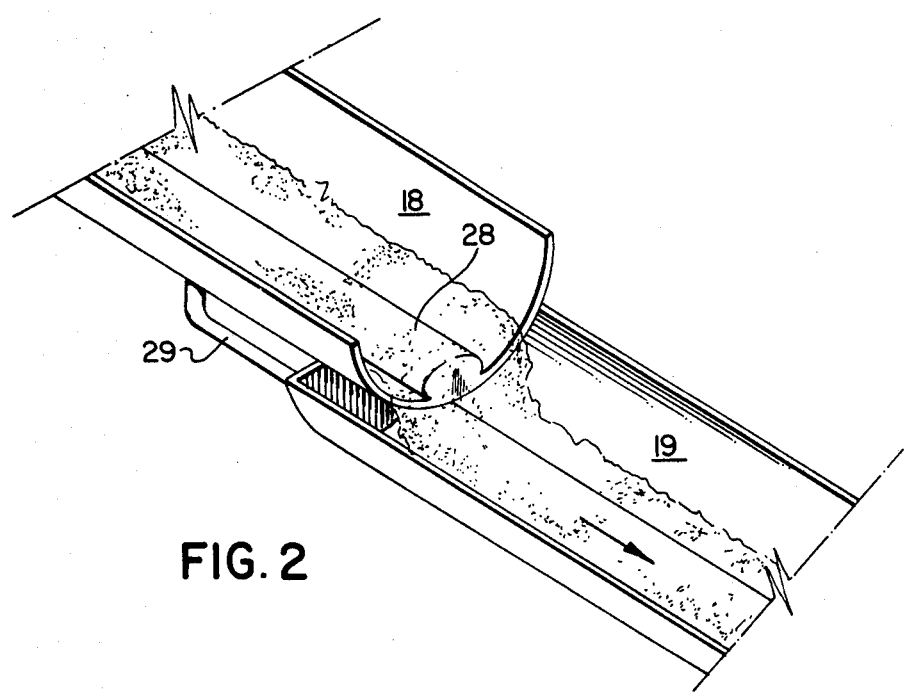
FIG. 2 shows a broken-away view, in perspective, of part of the troughing of the apparatus of FIG. 1.
Figure 3:
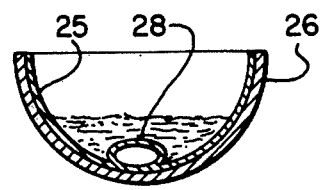
FIG. 3 shows a view taken in transverse section through the troughing of FIG. 2.

Referring firstly to FIG. 1 of the accompanying drawings, a tracked vehicle indicated generally by reference numeral 10 is shown on the top of a block 11 of sulfur.

The tracked vehicle 10 has a laterally extending jib 12 supporting, at its outermost end, a vertical post 14.

A steam supply pipe 15, extending from a steam source (not shown), is connected with a steam supply passage in the post 14, which communicates with a heating element 16 mounted at the lower end of the post 14.

As can be seen from FIG. 1, the heating element 16 has been lowered onto the sulfur block 11. Consequently, the sulfur underlying the heating element 16 has been melted by the heat of the steam supplied through the steam supply pipe 15 and the post 14.

Moreover, the heating element 16 is supported with one of its edges, indicated by reference numeral 17, projecting beyond the edge of the sulfur block 11.

A collecting trough 18 is disposed below, and extends along, the projecting edge 17 of the heating element 16, and serves to collect molten sulfur which, having been heated by the heating element 16, flows along the underside of the heating element 16, to which it adheres by surface tension, to the lowermost edge 17 of the heating element 16.

The trough 18 is disposed at an inclination to the horizontal, longitudinally of the trough 18, so that the molten sulfur flows along the trough 18 into a second trough 19 which, as can be seen, is downwardly inclined at a steeper angle along the side of the sulfur block 11 and which, in turn, discharges the molten sulfur into a third trough 20.

This third trough 20 is downwardly inclined for feeding the molten sulfur into a collecting pit 21, from which the molten sulfur can be pumped, as required, for transportation elsewhere.

As can be seen from FIG. 1, the heating element 16 has already penetrated downwardly, through a certain depth, into the sulfur block 11. As the molten sulfur flows from beneath the heating element 16 into the trough 18, the heating element 16 is lowered further so that it is maintained in sufficiently close proximity to the underlying surface of the sulfur to cause further melting of the sulfur.

When the heating element 16 has been lowered to a predetermined depth, it is then raised above the level of the top of the sulfur block 11, and the tracked vehicle 10 is operated to move the heating element over a further portion of the sulfur block 11. This further portion is then melted in the same way, and the procedure is repeated, as required, over the whole of the area of the sulfur block 11.

The trough 18 is formed as an upwardly-open metal shell 25 of semi-circular cross-section provided, at its outer side, with a layer 26 of heat-insulating material, preferably fiberglass, to retain the heat of the molten sulfur.

To counteract solidification of the sulfur in the trough 18, the shell 25 is provided with a pipe 28 extending along the bottom of the interior of the shell and connected to the steam source, the pipe 28 communicating through a connecting pipe 29 with a corresponding pipe in the trough 19.

Due to the low thermal conductivity of molten sulfur, the thinner the layer of molten sulfur between the underside of the heating element 16 and the underlying solid sulfur, the greater the heat transfer rate.

Also, the thinner the layer of molten sulfur, the greater the resistance to flow of the sulfur towards the lower edge 17 of the heating element 16.

Therefore, the downward movement and the inclination of the heating element 16 are regulated to provide the optimum thickness of the molten layer in order to maximize the heat transfer rate and the molten sulfur flow rate.

Figure 4:
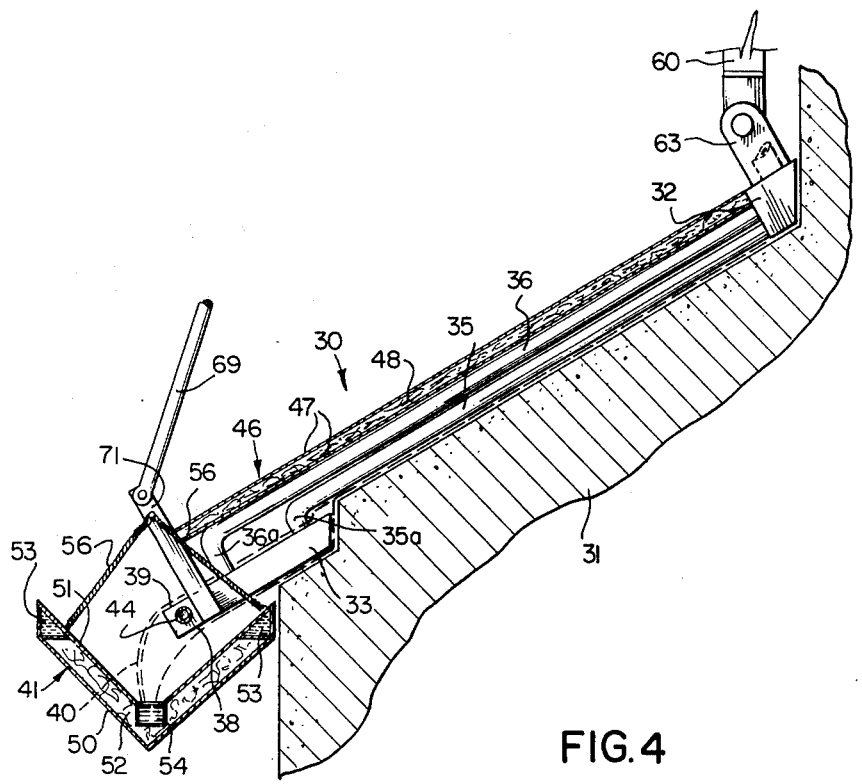
FIG. 4 shows a side view, partly in section, of a heating element and trough according to a preferred embodiment of the invention.
Figure 5:
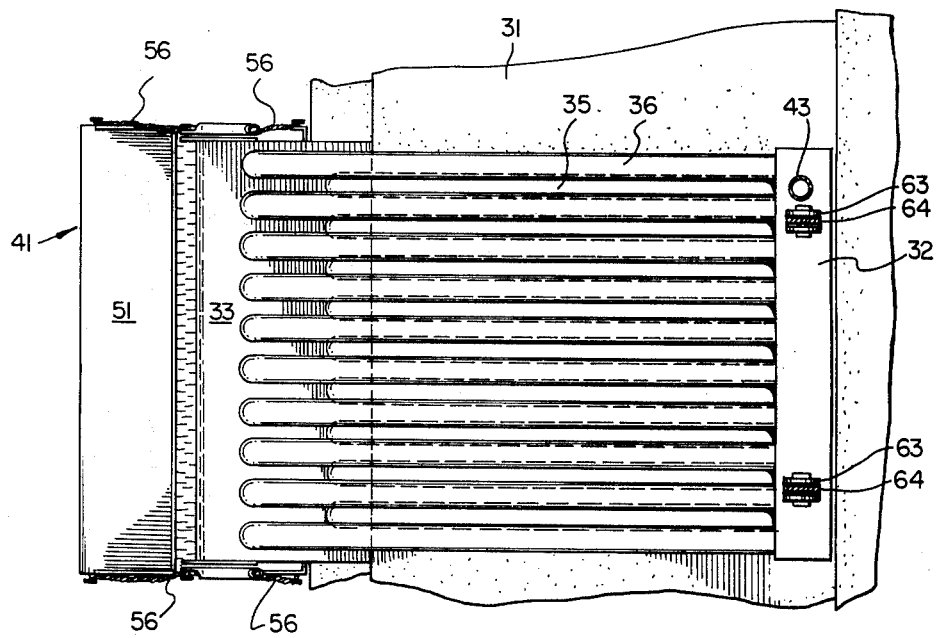
FIG. 5 shows a plan view of the heating element and trough of FIG. 4 with the cover thereof removed to reveal the pipe sections of the heating element.

FIGS. 4 and 5 of the accompanying drawings illustrate a preferred embodiment of the heating element according to the present invention, indicated generally by reference numeral 30.

As can be seen from FIG. 4, the heating element 30 is suspended at an inclination to the horizontal over a portion 31 of the sulfur block.

The heating element 30 has an upper header 32 and a lower header 33. Two sets of pipe sections extend in mutually parallel, downwardly inclined orientation between the upper header 32 and the lower header 33, the pipe sections of one of these sets or groups being indicated by reference numeral 35 and those of the other set being indicated by reference numeral 36.

Referring now to FIG. 5, it will be seen that the pipe sections 35 are laterally spaced apart from one another, and that the pipe sections 36 are similarly laterally spaced apart from one another. Moreover, the pipe sections 36 are disposed vertically above the spacings between the pipe sections 35, the latter being generally coplanar and being downwardly offset from the pipe sections 36, which are also generally coplanar.

The purpose of this arrangement of the pipe sections 35 and 36 will be more readily apparent from consideration of the manner in which the sulfur is melted by the heating element 30.

More particularly, as the heating element 30 is lowered so that the pipe sections 35, which are downwardly freely exposed over a major portion of their lengths, approach the underlying solid sulfur, the sulfur will be melted along grooves extending along and beneath the pipe sections 35.

However, the sulfur underlying the spacings between the pipe sections 35 will be less readily melted, and will tend to remain solid in the form of parallel, upwardly extending laterally spaced ribs of solid sulfur.

As the heating element 30 moves downwardly, these ribs will extend between the pipe sections 35, and will eventually be melted by heat transferred thereto from the pipe sections 36.

The pipe sections 35 and 36 communicate with the lower header 33 through downwardly extending pipe portions 35a and 36a the lengths of which are such that the whole of the lower header 33 is downwardly offset from the lowermost pipe sections 35.

The header 33 has a flat, rectangular undersurface 38 and a flat rectangular upper surface 39. The surfaces 38 and 39 both serve as flow surfaces for the flow of the molten sulfur. This molten sulfur is discharged, as indicated by broken lines 40, into a trough indicated generally by reference numeral 41.

It has been found in practice that the molten sulfur which flows beneath the header 33 and across the flow surface 38 tends to adhere, by surface tension, to the flow surface 38 until it is discharged from the lowermost edge of the heating element 30. In this way, this molten sulfur is caused to flow outwardly beyond the edge of the sulfur block 31 instead of trickling downwardly along the outer face of the sulfur block 31.

The header 32 is provided with an inlet opening 43, through which steam is supplied into the heating element, and this steam flows along the length of the header 32 and downwardly through the pipe sections 35 and 36 to the lower header 33, which is provided with an outlet 44 for condensate.

To counteract loss of heat in an upward direction from the pipe sections 35 and 36, the heating element 30 is provided with a heat insulating cover indicated generally by reference numeral 46. This heating insulating cover 46 comprises two metal plates 47 containing therebetween a layer 48 of insulating material, the plates 47 being made of aluminum and the insulating material of the layer 48 being of fiberglass.

The trough 41 is similarly made of inner and outer metal plates 50 and 51 sandwiching therebetween a layer of fiberglass insulating material 52.

In addition, the trough 41 is provided along its upper edges and along the bottom of its inner side with passages 53 and 54 to which steam is supplied for maintaining the sulfur in the trough 41 in a molten state.

The trough 41 is suspended beneath the lowermost edge of the heating element 30 by means of suspension cables 56.

The heating element 30 is, in turn, suspended by the suspension illustrated in FIGS. 6 and 7.

This suspension has a pair of vertical masts 60, which are of hollow, square cross-section, secured together by a truss indicated generally by reference numeral 61 so that the masts 60 are fixedly secured in parallel spaced relationship.

The lowermost ends of the masts 60 are pivotally secured to the heating element 30 by pivots 62 connecting lugs 63 on the heating element 30 and lugs 64 at the lower ends of the masts 60.

The mast truss 61 is connected to the lower edge of the heating element 30 by a ram comprising a cylinder 66 connected by a pivot pin 67 to a lug 68 on the mast truss 61, and a piston rod 69 connected by a pivot pin 70 to an arm 71 secured to the heating element 30.

As will be evident, extension and retraction of the piston rod 69 cause the heating element 30 to be pivoted in a vertical plane about the pivot pin 62.

The masts 60 are guided for vertical sliding movement in a pair of mast guides 73, which are pivotally secured by lugs 74 and pivots 75 to the outer ends of jibs 76, of which only one is shown.

A piston and cylinder device indicated generally by reference numeral 80 extends between one of the mast guides 73 and the respective jib 76, and comprises a cylinder 81, which is pivotally secured by a pivot pin 82 and a lug 83 to the jib 76, and a piston rod 84, which is pivotally secured by pivot 85 and a lug 86 to the mast guide 73.

Extension and retraction of the piston and cylinder device 80 causes the masts 60 to be pivoted in a vertical plane about the horizontal pivots 75.

A pulley 87 is freely rotatably mounted on a support bracket 88 provided on the end of the jib 76 and serves to guide a cable 99.

One end of the cable 89 is secured, as indicated by reference numeral 90, to a cross bar 91 extending between the masts 60, and the other end of the cable 89 is wound on a winch (not shown), so that by operation of the winch, the masts 60, and therewith the heating element 30, can be raised or lowered relative to the mast guides 73.

The jibs 76 extend from a vehicle (not shown), corresponding to the tracked vehicle 10 of FIG. 1, which is employed to support and move the heating element 30 over the sulfur block, and, in operation, the heating element 30 is repeatedly lowered onto the sulfur block to melt it in the same manner as described hereinbefore with reference to FIG. 1.

The hydraulic piston and cylinder devices enable the inclination of the heating element 30 to be varied in order to obtain optimum heat transfer and sulfur flow conditions. In addition, when the heating element has been lowered through almost the entire depth of the sulfur block and is approaching the ground, the inclination of the heating element can be gradually reduced until the heating element is almost horizontal, thus enabling almost the entire depth of the sulfur block to be melted.

During the travel of the heating element 30 downwardly through the sulfur block, the flexibility of the cables 56, which may of course be replaced by chains, allows the collecting trough 41 to deflect relative to the heating element 30 and the sulfur block 31 when the inner edge of the collecting trough 41 meets a projection or other irregularity in the side surface of the sulfur block 31.

Various modifications may be made in the apparatus and methods described above. For example, while reference has been made above to the use of steam as the heating medium, it is envisaged that heated glycol or any other suitable fluid heating medium may be used, and the apparatus may be modified to enable recirculation of the heating medium through the heating element by means, for example, of a return pipe (not shown).

Also, while the flow surface 38 of the heating element 30 is formed by the underside of the header 33, it is alternatively possible to provide this flow surface by means of a plate separate from the header 33 or attached thereto, and this plate could be extended upwardly to underlie the pipe sections, in which case only one of the groups of pipe sections 35 and 36 may be required. Furthermore, the shape of the flow surface may, for example, be corrugated or otherwise suitably adapted to promote the adherence and flow of the molten sulfur.

The embodiments of the invention in which an exclusive property or privilege is claimed are defined as follows:

1. A method of melting block sulfur, comprising the steps of:
   positioning a heating element on a block of sulfur so the heating element is downwardly inclined towards and projects beyond an edge of the sulfur block;
   supplying steam to said heating element to melt the sulfur beneath said heating element, whereby said melted sulfur flows downwardly at the underside of said heating element, to which it adheres by surface tension, and beyond said edge of the sulfur block; and
   collecting said melted sulfur beyond said edge.

2. A method as claimed in claim 1, which includes lowering said heating element as the sulfur beneath said heating element is melted to remove a portion of the sulfur block, raising said heating element, displacing said heating element horizontally to dispose said heating element over an immediately contiguous portion of the block, and subsequently lowering said heating element to melt said contiguous portion.

3. A method as claimed in claim 1, which includes feeding the collected sulfur by gravity to a position remote from said heating element.

4. A method as claimed in claim 3, which includes heating the collected sulfur to keep it molten.

5. Apparatus for melting block sulphur, comprising:
   a heating element;
   said heating element defining a plurality of mutually spaced flow passages in a generally planar array;
   steam inlet passage means communicating with said flow passages for supplying steam thereto;
   outlet means communicating with said flow passages for discharging condensate therefrom;

means defining a flow surface at the underside of said heating element at and adjacent at least one edge thereof for flowing molten sulphur by surface tension along the underside of said flow surface;

overhead suspension means extending downwardly to said heating element for suspending said heating element at an inclination, with said heating element being downwardly inclined towards said edge thereof;

said suspension means including means for raising and lowering said heating element; and trough means extending along and beneath said flow surface for collecting the melted sulphur beneath said flow surface defining means.

6. Apparatus as claimed in claim 5, wherein said heating element comprises a plurality of parallel, laterally spaced pipe sections.

7. Apparatus as claimed in claim 6, wherein said steam inlet passage means comprise a first header communicating with one end of each of said pipe sections and said outlet means comprise a second header communicating with the opposite end of each of said pipe sections.

8. Apparatus as claimed in claim 6, wherein said pipe sections comprise a first group of mutually spaced coplanar pipe sections and a second group of mutually spaced coplanar pipe sections, said groups being secured in different respective parallel planes with said pipe sections of said second group extending along and above the spacings between said pipe sections of said first group.

9. Apparatus as claimed in claim 6, wherein said heating element further comprises downwardly extending pipe portions communicating with said pipe sections at said edge of said heating element, said outlet means comprising a header at the lower ends of said downwardly extending pipe portions, said header having an upper surface downwardly offset from the undersides of said pipe sections and said flow surface defining means comprising the underside of said header, whereby said molten sulfur can flow over and under said header to said collecting means.

10. Apparatus as claimed in claim 5, further comprising means for movably suspending said trough means from said heating element.

11. Apparatus as claimed in claim 10, further comprising means for applying heat to the sulfur in said trough.

12. Apparatus as claimed in claim 11, wherein said heat applying means comprise a steam passage extending along the bottom of said trough.

13. Apparatus as claimed in claim 10, wherein said trough comprises heat insulating material for counteracting loss of heat from the melted sulfur.

14. Apparatus as claimed in claim 5, further comprising a covering of heat insulating material over said heating element.

15. Apparatus as claimed in claim 5, wherein said suspension means includes means for varying the inclination of said heating element.

* * * * *